March 27, 1934.  W. R. KUNZ  1,952,992
SHADE OPERATING DEVICE FOR MOTOR VEHICLES
Filed Aug. 9, 1932
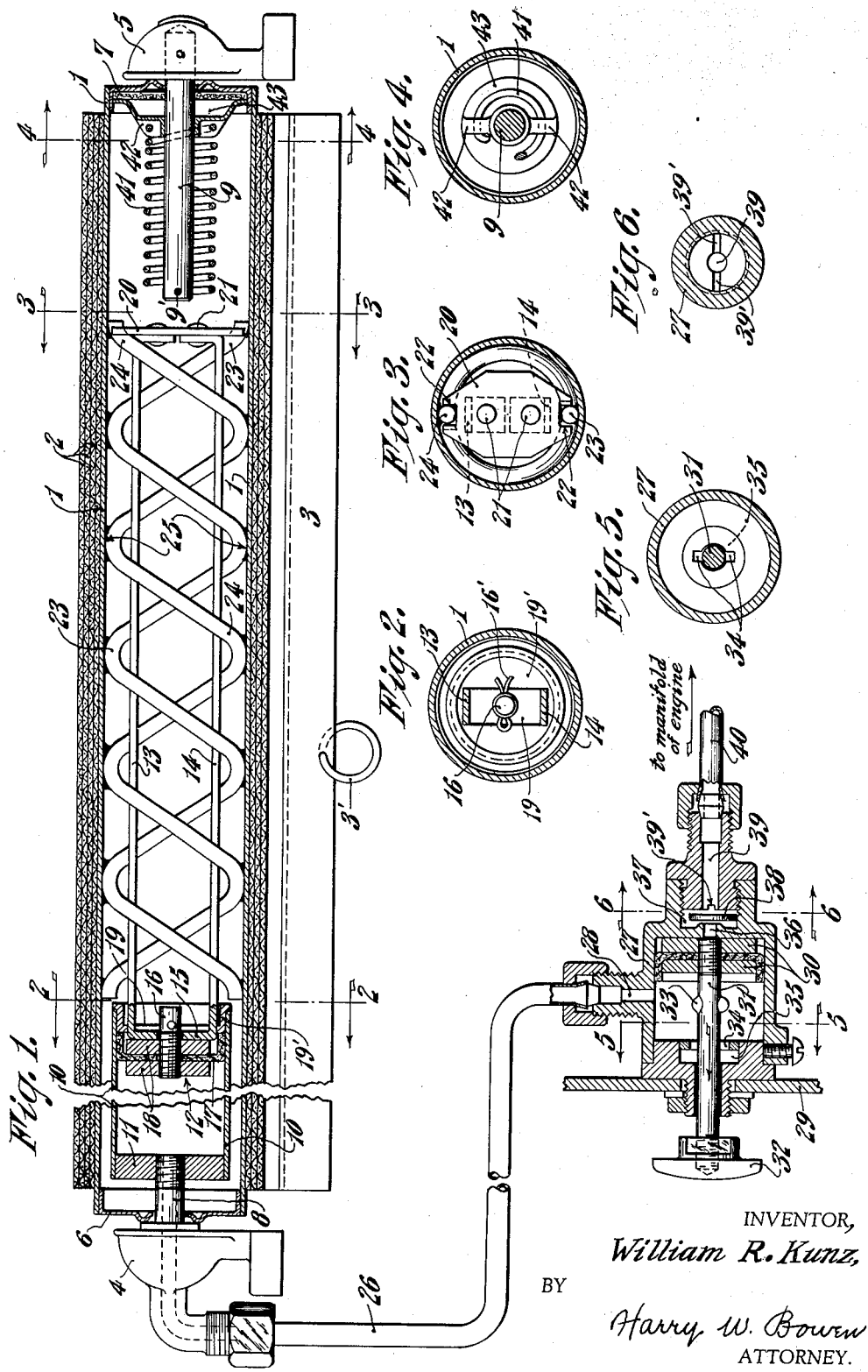
INVENTOR,
William R. Kunz,
BY
Harry W. Bowen.
ATTORNEY.

Patented Mar. 27, 1934

1,952,992

UNITED STATES PATENT OFFICE 1,952,992

SHADE OPERATING DEVICE FOR MOTOR VEHICLES

William R. Kunz, Springfield, Mass.

Application August 9, 1932, Serial No. 628,048

5 Claims. (Cl. 156—28)

This invention relates to improvements in shade operating devices for motor vehicles.

An object of my invention is to provide a device for automatically raising and lowering a shade or curtain for use over the window located in the rear of a motor vehicle, for preventing the rays of light from the head lights of a following car from passing through the same and being reflected back from the mirror above and in front of the driver. The device is automatically operated from the driver's seat by means of the suction effect of the manifold, whereby, through suitable valves, the shade may be lowered, and, when desired, it can be re-wound onto the roller.

Means is also provided for manually operating the shade, independent of the suction, or vacuum effect, of the manifold.

The invention, broadly considered, comprises a tubular member on which the shade is wound; a tubular member located within the shade roller proper; a piston in the inner tubular member; co-operating means between the piston and the shade roller for rotating the same, when a longitudinal movement is imparted to the piston, and suitable valve construction for imparting a reciprocating motion to the piston, as will be fully described.

It is a well known fact that the bright rays from a following car are often the cause of accidents, due to the blinding effect of the rays reflected into the eyes of the driver of the car ahead.

Referring to the drawing:

Fig. 1 is a longitudinal sectional view through the axis of the two tubular members, showing the connecting means, between the piston and shade roller, for rotating the same.

Fig. 2 is a transverse sectional view on the line 2—2 of Fig. 1, showing the end of the parallel bars in section, the securing means for the same, and the shade roller in section.

Fig. 3 is a transverse sectional view on the line 3—3 of Fig. 1, showing means for attaching the parallel bars to the slotted plate, through which the helical rods pass.

Fig. 4 is a view on the line 4—4 of Fig. 1, showing the manner of attaching the coiled spring, which re-winds the curtain on the roller, when the vacuum is released.

Fig. 5 is a view on the line 5—5 of Fig. 1, illustrating the retaining means for the operating valve, and Fig. 6 is a view on the line 6—6 of Fig. 1, showing the by-pass valve for controlling the vacuum.

Referring to the drawing in detail:

1 indicates the tubular roller, shown broken and on which the several turns, 2, of the shade 3, are wound. 4 and 5 indicate brackets, or supports, which rotatably support the roller 1, by means of the end pieces, 6 and 7, which turn on the pipe end 8 and the shaft 9, as shown. 10 indicates a tubular member, which is shown broken and located within the shade roller 1, one end of which is fixedly secured to the pipe end 8, by means of the threaded plate 11. Slidably located within the tubular member 10, is the piston 12, having attached thereto the parallel bars, 13 and 14, by means of the intermediate integral part 15, through which extends the threaded pin 16 that also secures the packing 17, and nuts 18, in place. 16' is a cotter pin. 19 indicates a rectangular opening formed in the part 19' in which is engaged the end of the bars 13 and 14 by the threaded pin 16 and cotter pin 16'. The opposite ends of the parallel bars 13 and 14 are bent inward and secured to the plate 20 with the rivets 21. This plate is formed with the notches, or recesses 22, at its opposite ends. (See Fig. 3.) Surrounding the bars 13 and 14, are the two helical-shaped wires 23 and 24, that are circular in cross section, as shown in Fig. 3. These wires are fixedly secured to the inner surface of the shade roller 1, by soldering, or brazing, as indicated at 25, or any other suitable way, as by friction alone.

Connected to the pipe end 8, is a pipe 26, which terminates in the casing 27, having the passageway 28. This casing is attached to the instrument board 29. 30 indicates a piston in the casing that is connected to the operating rod 31, having the knob 32. Formed on the rod 31 are two lateral projections 33, that are designed to pass through the openings 34, when in alignment therewith, and operated to retain the piston 30 at the left hand end of its travel, in the space 35, when the operator partially rotates the rod 31, as will be explained in the operation of the apparatus. The port 28 is now open. The piston 30 is designed to open and close the opening 36, which leads to the opening 37, in which is located the loose valve disc 38, for opening and closing the passage 36, that is connected by means of the pipe 40, to the manifold of the engine, (not shown).

Located at the right hand of and within the roller 1, is a coiled spring member 41, for rotating the roller 1 when the shade is to be raised and after the vacuum effect is released. One end of this spring is secured to the fixed rod 9, indicated at 9', and its other coiled end is passed through openings in the flange 42 of the disk 43 which turns on the shaft 9, that is secured to the bearing bracket 5.

The operation may be described as follows, assuming the parts to be in the positions shown: the piston valve 30 normally closes the opening 36 to the pipe 40, that is connected to the manifold of the engine. The operator, by means of the knob 32, now moves the piston valve 30 in the direction of the arrow on the rod 31, permitting the projections 33 to pass freely through the openings 34. He then partially rotates the rod 31 to bring the projections out of alignment of the openings 34, for retaining the piston valve 30 in its open, or operative position. The passageway 28 is now open, thus connecting the pipe 26 to the manifold, or, in direct communication with the suction effect, which is transmitted to the piston 12 in the inner tubular member 10. This piston is now moved towards the left hand carrying with it the parallel bars 13 and 14, the helical members 23 and 24 pass or slide freely through the recesses 22 in the end plate 20, whereby a rotary motion is transmitted to the shade roller 1, through the action of these helical members, 23 and 24, that are secured to the shade roller. The shade 3 will now be unwound from the roller 1 and lowered. When it is desired to re-wind the shade on the roller 1, the piston valve 30 is moved into the position shown in Figure 1, permitting atmospheric air to enter the space 35 around the piston rod 31, through the opening 28, pipe 26, pipe end 8, into the inner tubular member 10, whereby the piston 18 will now return to its position, shown in Fig. 1, and the shade 3 will be re-wound. When the pressures on the opposite sides of the loose valve disk 38 are equal, it will occupy the middle position shown in Fig. 1, but should the suction effect decrease, the disk 38 will close the port 36 and retain the curtain 3 in a lowered position. Normally, the disk 38 closes the passage 39 when the engine is operating, but the groove 39' permits the apparatus to operate, as the shade rolling disk is smaller in diameter than the space 37 and the groove 39' permits air to pass into the manifold.

The coiled spring 41 permits the operator to manually lower and raise the shade, by means of the ring 3'. When the shade is lowered, the spring is wound up and when the pull on the shade is released, this spring will re-wind the shade 3. The shade may be drawn downward by hand by means of the ring 3'.

It should be stated that the present invention is believed to involve a new and original idea of providing means for operating a shade roller, independently of each other; either by the vacuum effect, or, manually. The manual drawing of the shade may be effected, when the vacuum fails or is insufficient.

The coiled spring 41, it should be stated, will be wound up and placed under tension, when the roller 1 is rotated by the vacuum effect. When the vacuum is released, by moving the piston 30 into the position shown in Fig. 1, the spring 41 will re-wind the shade.

What I claim is:—

1. A device for operating a shade roller on which a shade is wound, a stationary tubular member located within the shade roller, a piston in said member, communicating means between the piston and a suction device, a control valve in said means, bars connected to the piston and slidably secured in said tubular member to prevent rotation of the bars, a helical member located outside of the bars and secured to the shade roller and piston, a plate secured to the bars and formed with an opening in which the helical member is engaged, whereby the shade on the roller will be wound off of the same when the piston, bars and plate are actuated by the suction device.

2. In a shade-operating device, a roller to which the shade is secured, means for rotatably supporting the roller, a fixed tubular member within the roller, communicating means between the tubular member and the manifold of an internal combustion engine, a piston in the said member, and connecting means between the piston and the roller for imparting rotary motion to the roller, said means comprising a helical member connected to the shade roller, a bar secured to said piston, and a slotted plate secured to said bar and engaged by the helical member, and valve means in the communicating means for controlling the suction effect.

3. A shade-operating mechanism comprising a rotatably mounted roller, a shade secured thereto, a stationary tubular member located within the roller, a piston therein, bar members connected to the piston and slidably secured in said tubular member to prevent rotation, a slotted plate connected to the bar members, helical members secured to the roller and each having a bearing in a slot of the plate, communicating means between the piston and the manifold of an internal combustion engine, a valve device in said means for opening and closing the communication, and means for retaining the valve device in its open position.

4. In a device for operating the shade roller on which a shade is wound, a tubular member located within the shade roller, a cup member fixedly secured in an end of said tubular member, a piston in said member, a vacuum producing means, communicating means between the piston and the said vacuum means, a control valve in said means, bars connected to the piston and slidably guided in a slot formed in said cup member to prevent rotation of said bars, helical members located outside of the bars and secured to the the shade roller, a plate secured to the bars and formed with diametrically opposed notches in which the helical members are slidably engaged, whereby the roller will be rotated when the piston is actuated by the suction device.

5. In a device for operating a shade roller comprising, in combination with the roller, means for rotatably supporting the roller, a vacuum producing device, a fixed tubular member in the roller, communicating means between the tubular member and the vacuum device, a piston in the tubular member, a cup-shaped member secured to the piston and formed with an opening, parallel rods secured to the cup-shaped member and piston and extending through the opening in the cup-shaped member, a plate to which the opposite ends of the said rods are secured, the plate having notches in its edges, helical members secured to the inner surface of the roller, and located outside of the parallel bars, one of the ends of the helical members being located in the notches of the said plate, whereby, when a vacuum is produced in the tubular member the piston and bars will be reciprocated and impart a rotary motion to the roller through the engagement of the said bars with helical members which are secured to the roller, and means for automatically rewinding the roller when the vacuum is released.

WILLIAM R. KUNZ.